A. S. BALLARD.
Ice Cream Freezer.
No. 85,420.
Patented Dec. 29, 1868.
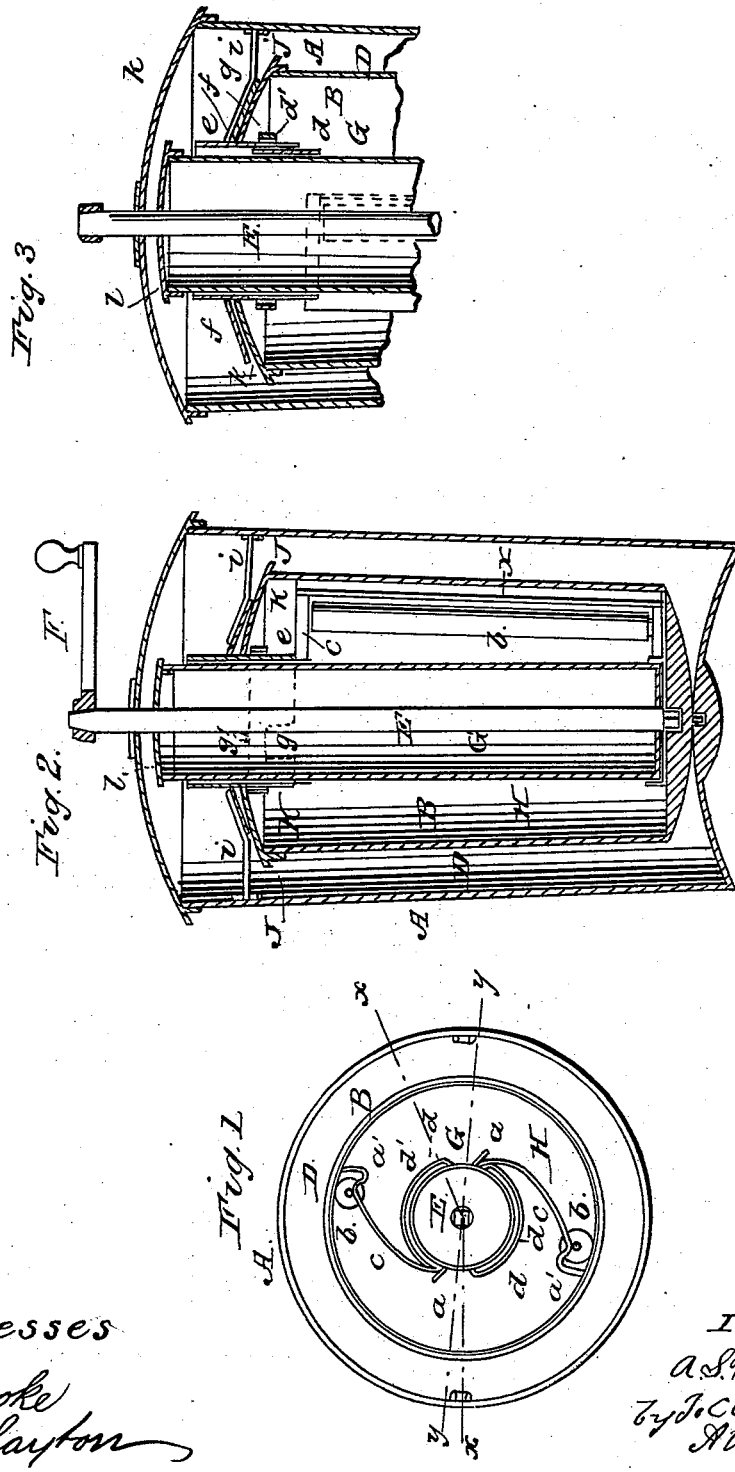

ALLEN S. BALLARD, OF MOUNT PLEASANT, IOWA.

Letters Patent No. 85,420, dated December 29, 1868.

IMPROVED ICE-CREAM FREEZER.

The Schedule referred to in these Letters Patent and making part of the same.

*To all whom it may concern:*

Be it known that I, ALLEN S. BALLARD, of Mount Pleasant, in the county of Henry, and in the State of Iowa, have invented a certain new and useful "Improved Ice-Cream Freezer;" and I do hereby declare that the following is a full, clear, and exact description thereof, reference being had to the accompanying drawings, and letters of reference marked thereon, in which—

Figure 1 is a plan view with the covers removed.

Figure 2 is a vertical section through the line of $x\, x$ in fig. 1.

Figure 3 is a vertical section through the line of $y\, y$, fig. 1.

The nature of my invention consists in making an ice-cream freezer with an inner and outer ice-chamber, having the chamber in which the milk is placed to be frozen between the ice-chambers, and with providing the milk-chamber with a combination of scrapers, and spring-scrapers, and rollers, which are stationary, at the same time the ice-cylinders are operated, and the manner of operating the cylinders, scrapers, and rollers, as will be more fully hereinafter described.

To enable others skilled in the art to make and use my invention, I will proceed to describe its construction and operation.

In the construction of my invention, I make the outer cylinder A, as ordinary cylinders are made for such purpose. On the bottom of this cylinder is a projection, which serves as a journal-box, on which the end of the shaft or journal of the inner cylinder rests.

B is the inner cylinder, conforming in shape to the outer cylinder, but smaller in its diameter, thus leaving, between the cylinders A and B, an ice-chamber, marked D.

In the lower end of this cylinder is a square socket, in which rests the shaft E, which, by means of the crank F, revolves the cylinders B and G, while the scrapers $a\, a$, $a'\, a'$, and rollers $b\, b$, remain stationary.

The scrapers $a'\, a'$ and rollers $b\, b$ are attached to springs $c\, c$ and $c'\, c'$, the collars $d$ and $d'$ surrounding the inner cylinder G.

The scrapers $a\, a$ are also attached to collars $d$ and $d'$, and are to scrape the outer side of the cylinder G; and the scrapers $a'\, a'$ and rollers $b\, b$, on springs $c\, c$ and $c'\, c'$, operate on the inner side of the cylinder B.

Between these cylinders B and G is the cream-chamber, in which is to be frozen the cream. This chamber is marked H.

On the upper collar $d$, are two points projecting a short distance up, to receive the collar $e$, on the lower side of the secondary lid $f$.

This collar, which passes through said lid $f$, has two slots $g$ cut into its lower end, which fits down on to the points $g'\, g'$, and holds stationary the scrapers and rollers.

The collar $e$ surrounds the cylinder G. To the collar $d$ are attached supplementary collars $d'$ and $d'$. These collars are two segments of a circle, being fastened permanently to collar $d$, and upon the sides of said collar, into the space between the collars $d$ and $d'$, the lower ends of collar $e$ project, so as to make a secure fastening of the collars $e$ and $d$, while operating the machine.

On the top of lid $f$ are firmly attached two arms $i\, i'$, which arms fit into sockets $j\, j$, on the inner face, and at the top of outer cylinder A, the arms hold, by means of the collars $e$ and $d$, the scrapers, and spring-scrapers, and rollers stationary, while the two cylinders B and G revolve.

K is the lid, covering the cream-chamber H.

$l$, the lid covering the inside cylinder G, and which fits down tightly into cylinder G, and through lid $f$, and through which passes the shaft E, and which guides and supports said shaft.

K', the lid fitting into cylinder A, with a hole in the centre, so strengthened as to serve as a journal-box for shaft E, which passes through it.

In the operation of my invention, the machine having been constructed as described, the cream is placed in the chamber H, in which are the scrapers and rollers. The ice is put into the ice-chambers D and D'. Motion is then given to the crank F, which revolves shaft E, which is safely fastened to the lower end of cylinder G, and has a square journal on its lower end, fitting into the socket at the bottom of cylinder B. Both cylinders are made to rotate with the shaft E, thus revolving rapidly both cylinders, between which the cream is contained. As these revolve, the scrapers and rollers remain stationary, so that as the cream is being frozen, and has a tendency to freeze to the cylinders, it is immediately scraped off, and is prevented from freezing to the cylinders.

The elasticity of the springs $a'\, a'$ and rollers $b\, b$ removes to a great extent the friction of the said rollers and scrapers $a'\, a'$ and $b\, b$.

It will be seen that by my invention, I am able to present two freezing-surfaces to the cream, as my invention has two ice-cylinders B and G, and as they are made to revolve quickly, assisted by the rollers and scrapers, on or against each cylinder, the cream is brought in contact with the ice-cylinders, and is very quickly frozen.

By means of the stationary scrapers and rollers, the cream, in revolving in the chamber H, between the cylinders B and G, is well mixed up, and presents readily all parts of the cream in turn to bear on the ice-cylinders, until the entire lot of cream is frozen. When this is done, it is readily removed, as it is done ordinarily.

Having thus fully described the construction and operation of my invention,

What I claim as new, and desire to secure by Letters Patent, is—

1. The outer cylinder A and inner cylinders B and G, forming two ice-chambers, in combination with the revolving cream-chamber H, and stationary scrapers $a\, a$ and $a'\, a'$, rollers $b\, b$, springs $c\, c$ and $c'\, c'$, and segmental collars $d'$ and $d'$, constructed substantially as described, and operating as and for the purpose set forth.

2. The collars $d$ and $d'$, in combination with the springs $c\ c$ and $c'\ c'$, scrapers $a\ a$, $a'\ a'$, and rollers $b\ b$, constructed as described and for the purposes set forth.

3. The points $g'\ g'$ on collar $d$, slots in collar $e$ of lid $f$, segment-collars $d'\ d'$, in combination with arms $i\ i'$ on lid $f$, and sockets $j\ j'$, constructed as described, and operating as set forth.

In testimony that I claim the above-described certain new and useful "improved ice-cream freezer," I have hereunto signed my name, this 31st day of March, 1868.

ALLEN S. BALLARD.

Witnesses:
W. D. LEEDHAM,
W. T. SPEARMAN.